United States Patent
Fujimoto et al.

(10) Patent No.: US 6,798,479 B2
(45) Date of Patent: Sep. 28, 2004

(54) LIQUID CRYSTAL DISPLAY DEVICE AND PROCESS FOR MAKING THE SAME

(75) Inventors: Hisayoshi Fujimoto, Kyoto (JP); Norihiro Imamura, Kyoto (JP); Toshihiko Takakura, Kyoto (JP)

(73) Assignee: Rohm Co., Ltd., Kyoto (JP)

(*) Notice: Subject to any disclaimer, the term of this patent is extended or adjusted under 35 U.S.C. 154(b) by 0 days.

(21) Appl. No.: 10/176,665

(22) Filed: Jun. 19, 2002

(65) Prior Publication Data

US 2003/0038906 A1 Feb. 27, 2003

(30) Foreign Application Priority Data

Jun. 19, 2001 (JP) ........................................ 2001-184818

(51) Int. Cl.⁷ ...................... G02F 1/1335; G02F 1/1337
(52) U.S. Cl. ...................................... 349/113; 349/123
(58) Field of Search ................................. 349/113, 123

(56) References Cited

U.S. PATENT DOCUMENTS

| | | | | |
|---|---|---|---|---|
| 4,004,848 A | * | 1/1977 | Yamazaki | 349/186 |
| 5,418,635 A | * | 5/1995 | Mitsui et al. | 459/70 |
| 5,847,789 A | * | 12/1998 | Nakamura et al. | 349/99 |
| 6,097,459 A | * | 8/2000 | Shimada et al. | 349/113 |
| 6,426,787 B1 | * | 7/2002 | Satake et al. | 349/138 |

FOREIGN PATENT DOCUMENTS

| | | | |
|---|---|---|---|
| JP | 354156650 A | * | 10/1979 |
| JP | 2000-019498 | | 1/2000 |

* cited by examiner

*Primary Examiner*—Dung T. Nguyen
*Assistant Examiner*—Hoan Chau Nguyen
(74) *Attorney, Agent, or Firm*—Merchant & Gould P.C.

(57) ABSTRACT

A liquid crystal display device includes a first and a second substrates (1, 2) disposed in parallel to each other, a liquid crystal layer (3) disposed between the two substrates (1, 2) and filled with liquid crystal, and a reflective electrode (13) having a reflective surface (13a) on which light rays coming from the outside through the first substrate (1) and the liquid crystal layer (3) are reflected towards the first substrate (1). The reflective surface (13a) of the reflective electrode (13) is undulated. The reflective surface (13a) of the reflective electrode (13) is provided with an alignment film (14B) for twisting liquid crystal molecules contained in the liquid crystal layer (3). The height of the undulation on the reflective surface (13a) of the reflective electrode (13) is smaller than at least the thickness of the alignment film (14B) at a concave portion of the undulated reflective surface (13a).

6 Claims, 7 Drawing Sheets

FIG.10
Prior Art

LIQUID CRYSTAL DISPLAY DEVICE AND PROCESS FOR MAKING THE SAME

FIELD OF THE INVENTION

The present invention relates to a liquid crystal display device and a process for making the same.

BACKGROUND OF THE INVENTION

Figure 6:
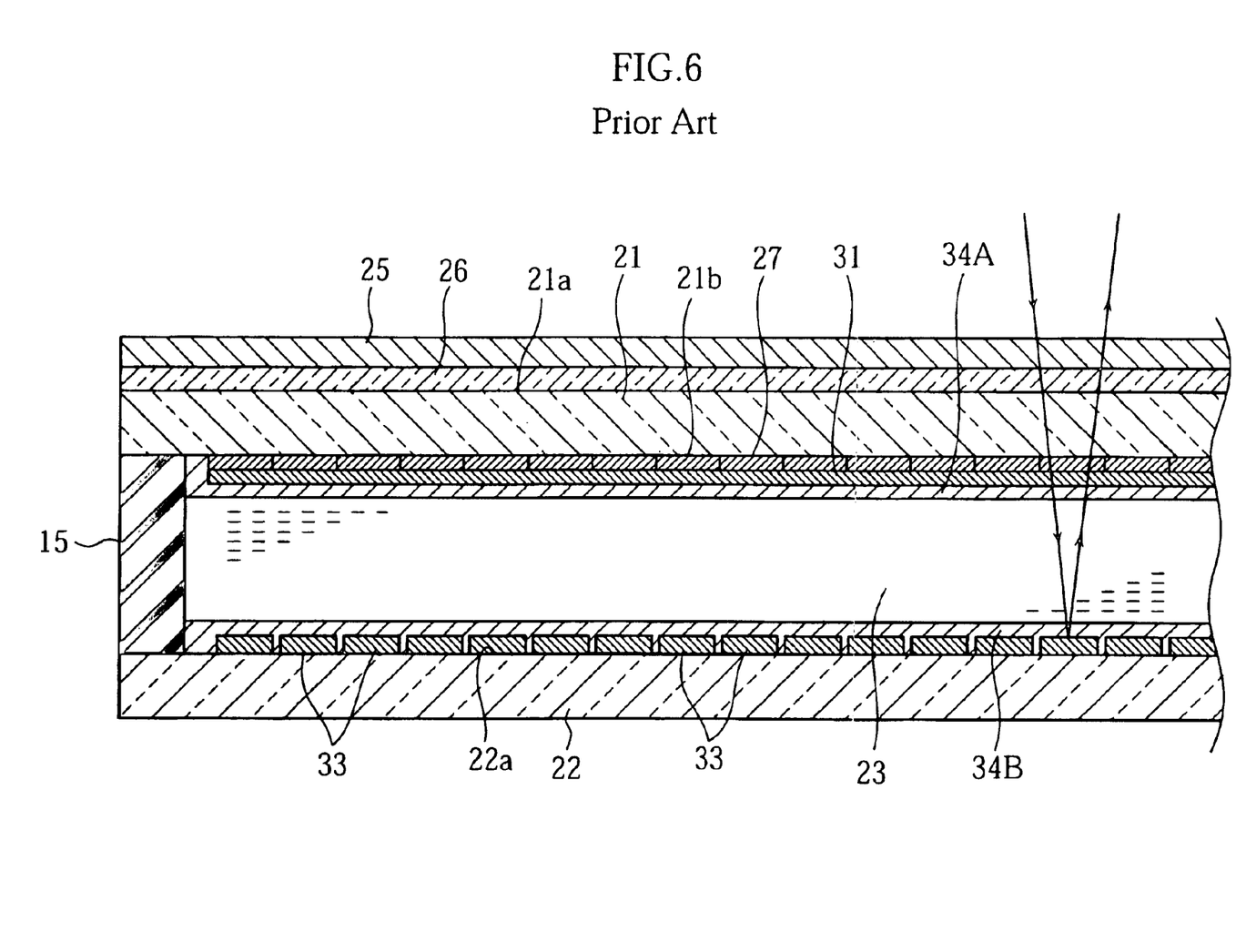
FIG. 6 is a sectional view showing a principal portion of a conventional liquid crystal display device.

FIG. 6 is a sectional view showing a principal portion of an example of conventional reflective liquid crystal display devices. This liquid crystal display device includes a first and a second substrates 21, 22. The first and the second substrates 21, 22 are disposed in parallel to each other.

The first substrate 21 includes an upper surface 21a provided with a polarizer plate 25 and a retardation plate 26. The polarizer plate 25 allows penetration of light rays that vibrate only in a specific direction. The polarizer plate 25 restricts entry of light from the outside to the first substrate 21 or the exit of light from the first substrate 21. The retardation plate 26 is disposed between the first substrate 21 and the polarizer plate 25. The retardation plate 26 compensates for interference colors caused by birefringence at the liquid crystal. This increaces the viewing angle.

The first substrate 21 includes a lower surface 21b on which a color filter layer 27 is provided, and a plurality of transparent electrodes 31 in the form of strips are provided thereon. The second substrate 22 includes an upper surface 22a provided with a plurality of reflective electrodes 33 in the form of strips extending perpendicularly to the transparent electrodes 31.

The liquid crystal layer 23 lies between the first and the second substrate 21, 22. The liquid crystal layer 23 is filled with e.g. an STN (super-twisted nematic) liquid crystal. The liquid crystal layer 23 is surrounded by a seal member 35. Pixels are provided at intersections of the transparent electrodes 31 and the reflective electrodes 33. These pixels are arranged in a matrix. The surfaces of the transparent electrodes 31 and the reflective electrodes 33 are covered with alignment films 34A, 34B, respectively. The alignment films 34A, 34B twist liquid crystal molecules contained in the liquid crystal layer 23.

In the above liquid crystal display device, light rays entering from the outside travel through the polarizer plate 25, the retardation plate 26, the first substrate 21, the color filter layer 27, the transparent electrodes 31 and the liquid crystal layer 23. After travelling through the liquid crystal layer 23, the light rays are reflected upwardly by the reflective electrodes 33, and travel back through the same path to be emitted to the front side of the liquid crystal display device.

With a liquid crystal display device of such a structure, image display may be preferably provided using external light such as the room light or the sun light, without driving the light source (not shown) located inside the liquid crystal display device in order to keep the power consumption as little as possible. With the liquid crystal display device, the surface of each reflective electrode 33 may be a mirror so that a proper image display is obtained with the external light.

By using the reflective electrodes 33 as mirrors, the directivity of the reflected light rays is improved, consequently resulting in efficient use of light. On the other hand, the reflective electrodes 33 may give rise to the problem of a mirror imagin phenomenon which worsens the visibility.

In order to prevent the mirror imaging phenomenon, the surface of each reflective electrode 33 may be undulated. With this structure, the light rays coming from the first substrate 21 and the liquid crystal layer 23 are suitably scattered when reflected on the undulated surface of the reflective electrode 33. Therefore, the mirror imaging phenomenon and the contrast deterioration are prevented.

The alignment film 34B is formed to have a predetermined thickness by applying a polyimide resin or the like on the surface of each reflective electrode 33. Then, the surface of the alignment film 34b may be rubbed. By this treatment, those of the liquid crystal molecules S of the liquid crystal layer 23 located closest to the alignment film 34B are inclined at a predetermined angle (called a pre-tilt angle), as shown in the FIG. 7. The liquid crystal molecules S are oriented in one direction by rubbing, which facilitates untwisting the twisted molecules under voltage application.

Figure 8:
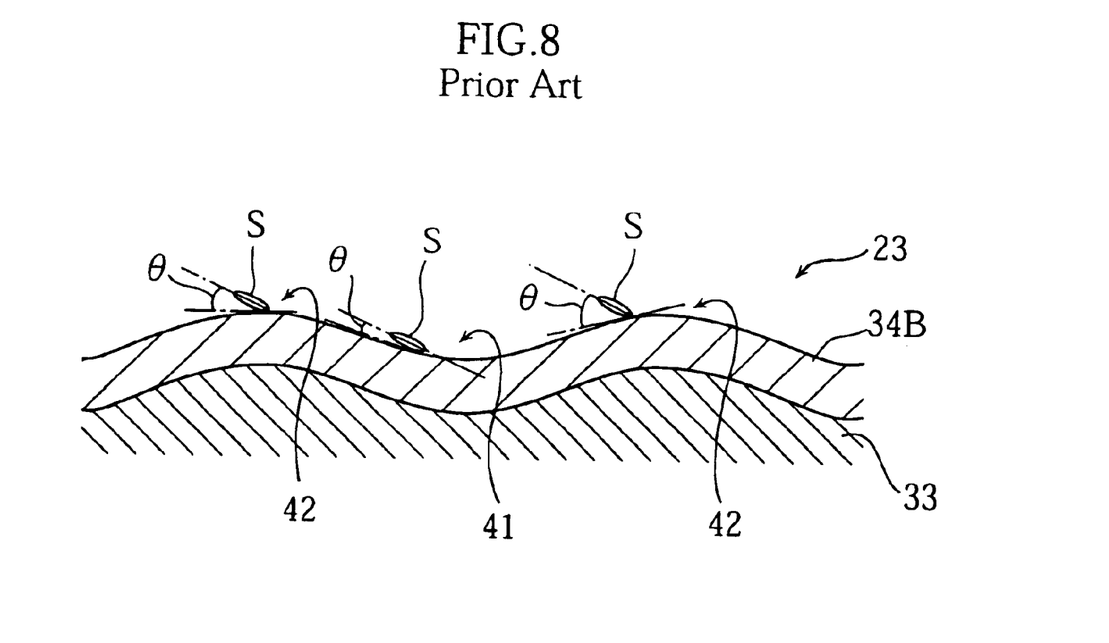
FIG. 8 is a view showing the orientation of liquid crystal molecules when the surface of the reflective electrodes is undulated.

The surface of each reflective electrode 33 is undulated. The alignment film 34B provided on the surface of the reflective electrode 33 is also undulated following the surface of the reflective electrode 33. The greater the undulation on the surface of the reflective electrode 33 is, the larger the undulation on the surface of the alignment film 34B will be. Therefore, the pre-tilt angle of the liquid crystal molecules S in the liquid crystal layer 23 varies depending on whether the molecules are located at a concave portion 41 or at a projection 42 on the undulated surface of the alignment film 34B, as shown in the FIG. 8. In other words, the pre-tilt angle of the liquid crystal molecules S differ from one display region to another. Such variations of pre-tilt angle between different display regions may result in failure of providing a desired contrast.

Figure 9:
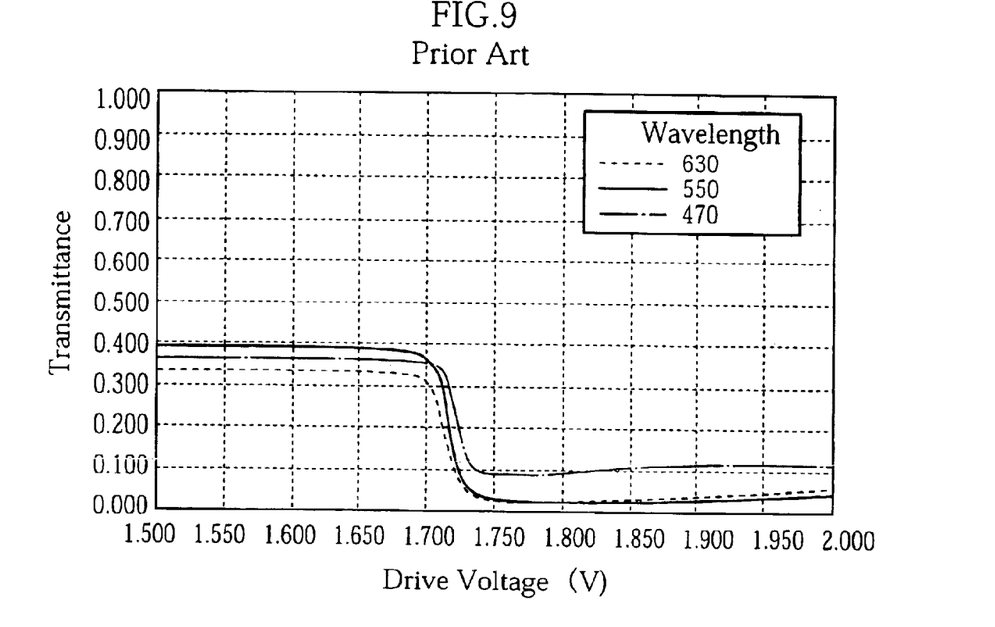
FIG. 9 is a graph showing the relationship between the transmittance of the liquid crystal display device and a voltage drive.
Figure 10:
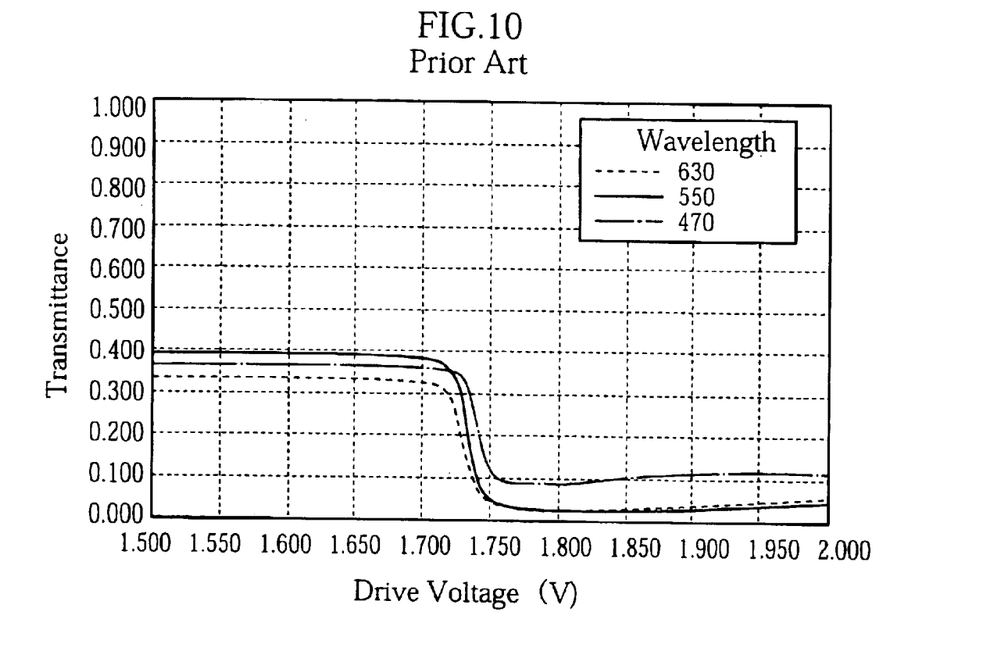
FIG. 10 is a graph showing another relationship between the transmittance of the liquid crystal display device and the voltage drive.

FIGS. 9 and 10 show an example of transmittance-drive voltage characteristics of a liquid crystal display device. FIG. 9 shows the case where the pre-tilt angle of the liquid crystal molecules located closest to the alignment film 34B is 2 degrees. FIG. 10 shows the case where the pre-tilt angle of the liquid crystal molecules located closest to the alignment film 34B is 0 degree. In both cases, the pre-tilt angle of the liquid crystal molecules located closest to the alignment film 34A for the first substrate 21 is 2 degrees.

According to the characteristics shown in these figures, the threshold drive voltage for changing the transmittance is approximately 1.70V where the pre-tilt angle of liquid crystal molecules is 2 degrees (refer to the FIG. 9). On the other hand, when the pre-tilt angle is 0 degree (refer to the FIG. 10), the threshold voltage is approximately 1.72V. In this way, there is a slight difference between the threshold drive voltages in these two cases. When the pre-tilt angle of the liquid crystal molecules varies, the threshold drive voltage also varies. The greater the difference between pre-tilt angles is, the greater the difference between the threshold voltages will be.

A voltage is applied separately on the transparent electrodes 31 and the reflective electrodes 33 in the passive matrix display mode, for example. If the transparent electrodes 31 or the reflective electrodes 33 include a display regions with different pre-tilt angles, i.e., display regions requiring different threshold voltages, an accurate voltage control is substantially impossible. Therefore, a desired contrast may not be obtained with this liquid crystal display device.

DISCLOSURE OF THE INVENTION

It is an object of the present invention to provide a liquid display device which is capable of eliminating or alleviating the problems described above.

According to a first aspect of the present invention, there is provided a liquid crystal display device which comprises a first and a second substrates disposed in parallel to each other, a liquid crystal layer disposed between the two substrates and filled with liquid crystal, and a reflective member having a reflective surface on which light rays coming from outside through the first substrate and the liquid crystal layer are reflected towards the first substrate. The reflective surface of the reflective member is undulated. The reflective surface of the reflective member is provided with an alignment film for twisting liquid crystal molecules contained in the liquid crystal layer. The height of the undulation on the reflective surface of the reflective member is smaller than at least the thickness of the alignment film at a concave portion of the undulated reflective surface.

Preferably, the liquid crystal display device may further comprise a smoothing layer for smoothing the undulated reflective surface of the reflective member is provided between the second substrate and the reflective member.

Preferably, the height of the undulation on the reflective surface of the reflective member may be in the range of 0.03–0.1 μm.

Preferably, the second substrate may be made of soda lime glass, and the smoothing layer may contain $SiO_2$.

According to a second aspect of the present invention, there is provided a process for making a liquid crystal display device which comprises a first and a second substrates disposed in parallel to each other, a liquid crystal layer disposed between the two substrates and filled with liquid crystal, and a reflective member having a reflective surface on which light rays coming from outside through the first substrate and the liquid crystal layer are reflected towards the first substrate. The process comprises the steps of forming a reflective member, which has an undulated reflective surface, on a surface of the second substrate, and forming the alignment film on the reflective surface of the reflective member. The step of forming the reflective member is performed in a manner such that the height of the undulation is smaller than at least the thickness of the alignment film at a concave portion of the undulation.

Preferably, the process may further comprise the step of forming a smoothing layer between the second substrate and the reflective member. The step of forming the smoothing layer includes applying a bond material containing $SiO_2$ on a surface of the second substrate and fixing the contained $SiO_2$ to form the smoothing layer.

Other features and advantages of the present invention will become apparent from the following detailed description given with reference to the accompanying drawings.

BEST MODE FOR CARRYING OUT THE INVENTION

Preferred embodiments of the present invention will be described below in detail with reference to the accompanying drawings.

First, reference is made to FIGS. 1–4. These figures illustrate a liquid crystal display device in accordance with a first embodiment of the present invention. This liquid crystal display device includes a first and a second substrates 1, 2 facing each other, and a liquid crystal layer 3 filled with e.g. an STN liquid crystal. The liquid crystal layer 3 is provided between the first and the second substrates 1, 2. The first and the second substrates 1, 2 may be made of glass or plastic, for example. The liquid crystal layer 3 contains particulate spacers which are not shown in the figures. These spacers maintain a predetermined thickness (e.g. about 5 μm) the liquid crystal layer 3.

Figure 1:
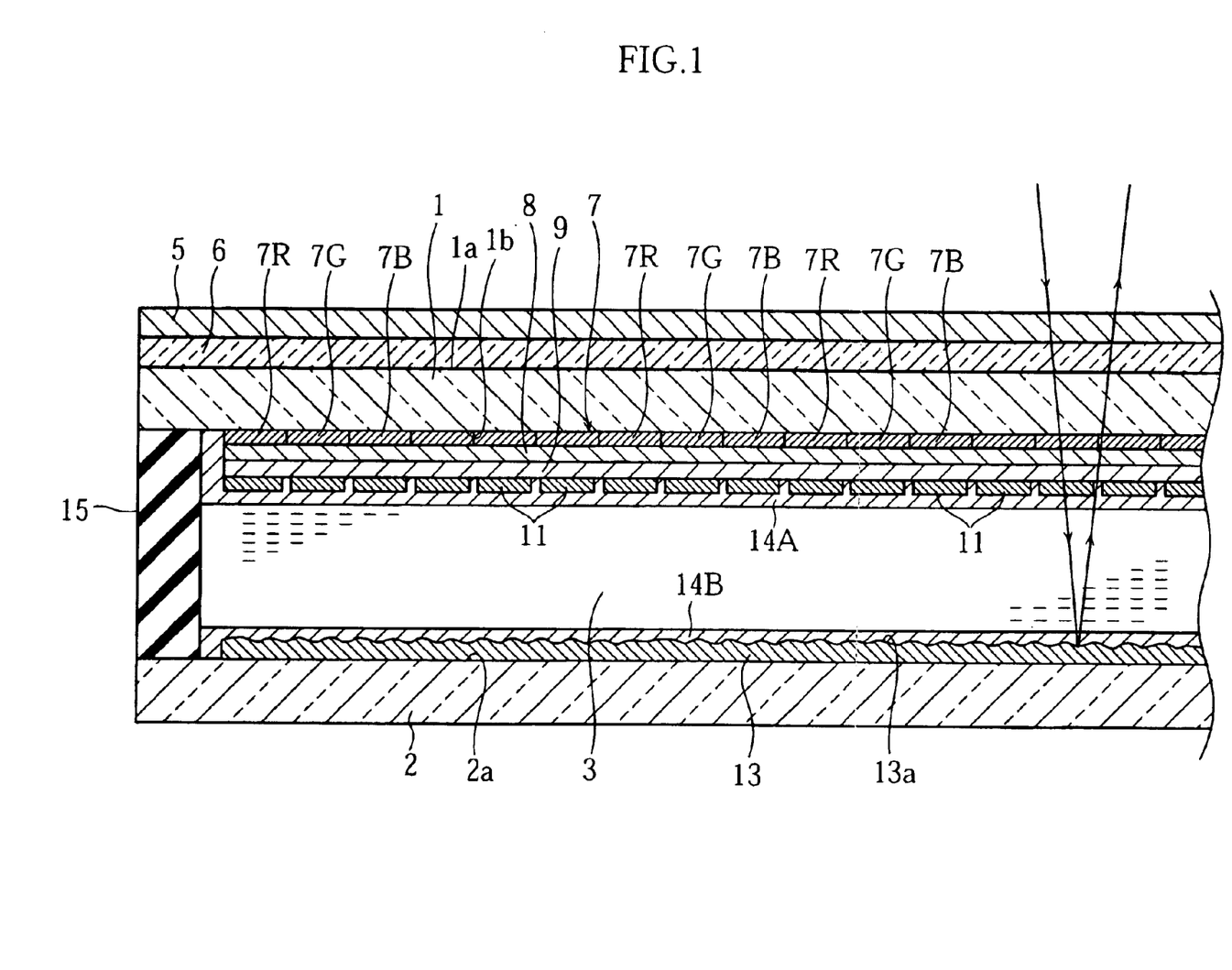
FIG. 1 is a sectional view showing a principal portion of a liquid crystal display device in accordance with a first embodiment of the present invention.

The first substrate 1 includes a surface 1b facing the second substrate 2, and an opposite surface 1a on which a polarizer plate 5 and a retardation plate 6 are provided in lamination. The polarizer plate 5 allows penetration of light rays that vibrate only in a specific direction. The polarizer plate 5 restricts entry of light from the outside to the first substrate 1 or exit of light from the first substrate 1. The polarizer plate 5 includes a polarizer film and protective films sandwiching it. The polarizer plate 5 may comprise a polyvinyl alcohol film stretched in one direction and impregnated with iodine.

The retardation plate 6 lies between the polarizer plate 5 and the first substrate 1. The retardation plate 6 compensates for interference colors caused by birefringence at the liquid crystal. This increaces the viewing angle. The retardation plate 6 comprises a film of a polymer (e.g. polycarbonate) laminated on the polarizer plate 5 with the use of an adhesive.

The surface 1b of the first substrate 1 facing the second substrate 2 is provided with a color filter layer 7. The color filter layer 7 comprises color filters 7R, 7G, 7B which are colored red, green and blue, respectively. Each of the color filters comprised in the color filter layer 7 is in the form of a strip. The color filters comprised in the color filter layer 7 are provided in side-by-side relation widthwise thereof. Each of the color filters 7R, 7G, 7B comprises a resin film which is respectively colored by a pigment or a dye, for example.

The color filter layer 7 includes a surface formed with an overcoat layer 8 and a bond-enhancing layer 9. The overcoat layer 8 protects a surface of the color filter layer 7. The overcoat layer 8 also smoothes the surface of the color filter layer 7. The overcoat layer 8 is made of an acrylic organic material applied by the spin-coat method and then cured. The bond-enhancing layer 9 is provided for strongly bonding transparent electrodes 11, which will be described hereinafter, to the overcoat layer 8. The bond-enhancing layer 9 may be made of $SiO_2$, for example. The bond-enhancing layer 9 comprises a thin film formed by vapor deposition or sputtering.

The bond-enhancing layer 9 includes a surface provided with a plurality of transparent electrodes 11 arranged in corresponding relationship with the color filters 7R, 7G, 7B. The transparent electrodes are strips, as shown in the FIG. 2. The transparent electrodes 11 are arranged in parallel to each other with a suitable widthwise spacing therebetween. Each of the transparent electrodes 11 is formed to be generally as wide as the respective color filters 7R, 7G, 7B by first performing e.g. sputtering to form an indium oxide (ITO) film doped with a small amount of e.g. Sn, and then etching the film.

The second substrate 2 has a surface 2a facing the first substrate 1 and provided with a plurality of reflective electrodes 13 each of which is in the form of a strip. The reflective electrodes 13, as shown in the FIG. 2, extend perpendicularly to the transparent electrodes 11. Each of the reflective electrodes 13 includes a surface 13a which functions as a reflector to reflect the light rays indicent through the first substrate 1 and the liquid crystal layer 3.

Figure 2:
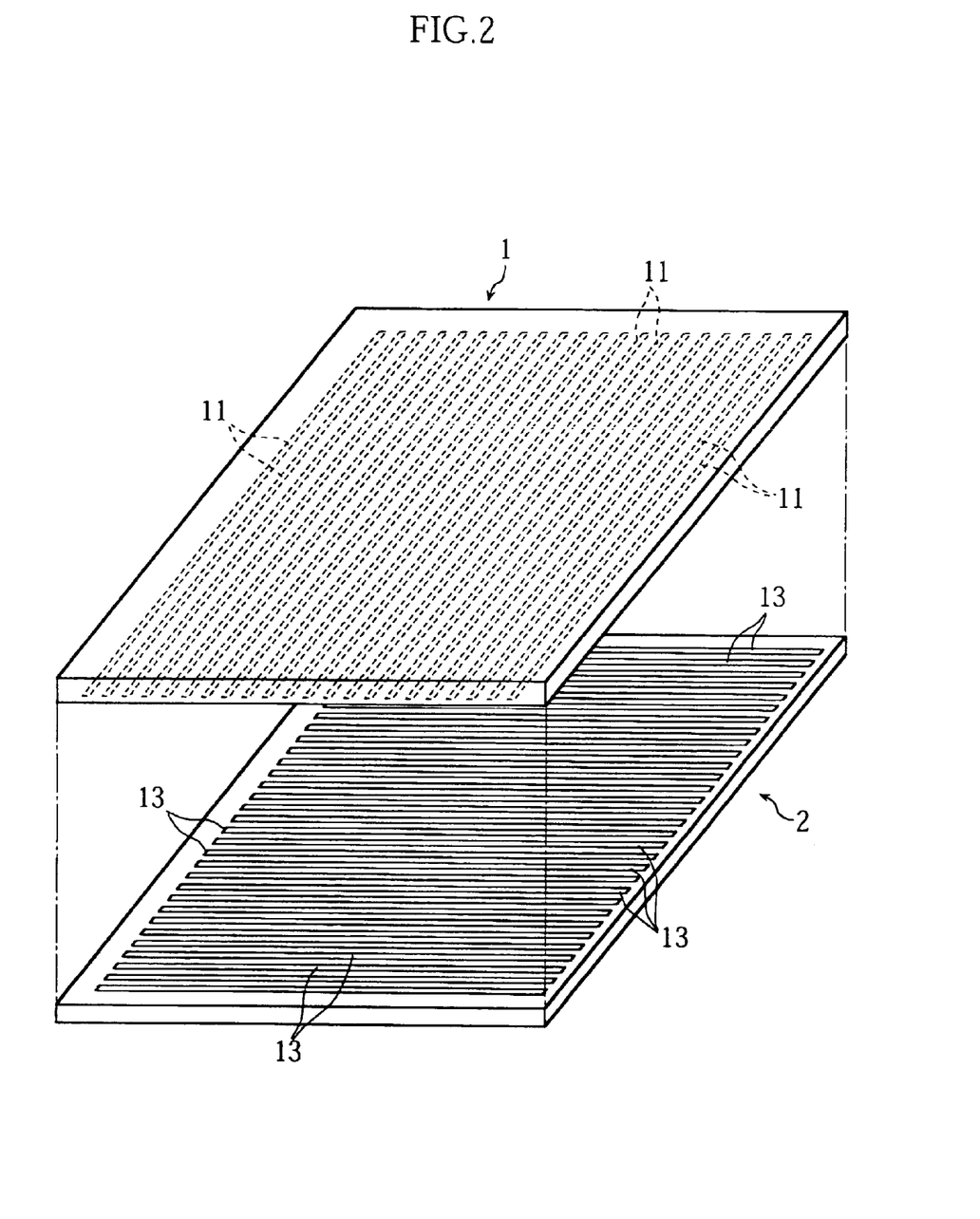
FIG. 2 is a perspective view showing a first and a second substrates of the liquid crystal display device shown in the FIG. 1.

With the structure mentioned above, pixels are provided respectively where three transparent electrodes 11 intersect a corresponding reflective electrode 13. Each of the pixels includes a red display region, a green display region and a blue display region provided in corresponding relationship with the color filters 7R, 7G, 7B. The pixels are selectively activated when a voltage is impressed across selected transparent electrodes 11 and corresponding reflective electrodes 13 to place the liquid crystal molecules under the influence of the voltage.

The transparent electrodes 11 are covered with an alignment film 14A. The reflective electrodes 13 are covered with an alignment film 14B. These alignment films 14A, 14B are provided in order to twist liquid crystal molecules. The alignment films 14A, 14B are formed by first applying a polyimide resin or the like on the surfaces of the transparent electrodes 11 and the reflective electrodes 13, drying it, and then rubbing the surfaces.

Figure 7:
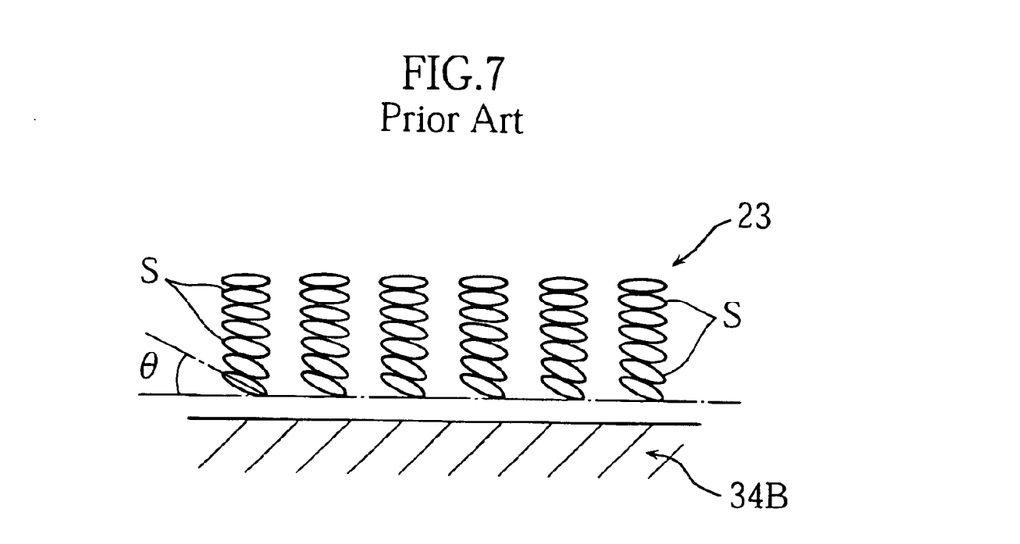
FIG. 7 is a view illustrating the pre-tilt angle.

The liquid crystal layer 3 surrounded by a seal member 15 is provided between the alignment films 14A, 14B. Rubbing the surfaces of the alignment films 14A, 14B causes liquid crystal molecules contained in the liquid crystal layer 3 to be regularly oriented with a given pre-tilt angle, as shown in FIG. 7. The pre-tilt angle facilitates untwisting the twisted molecules under voltage application.

Figure 3:
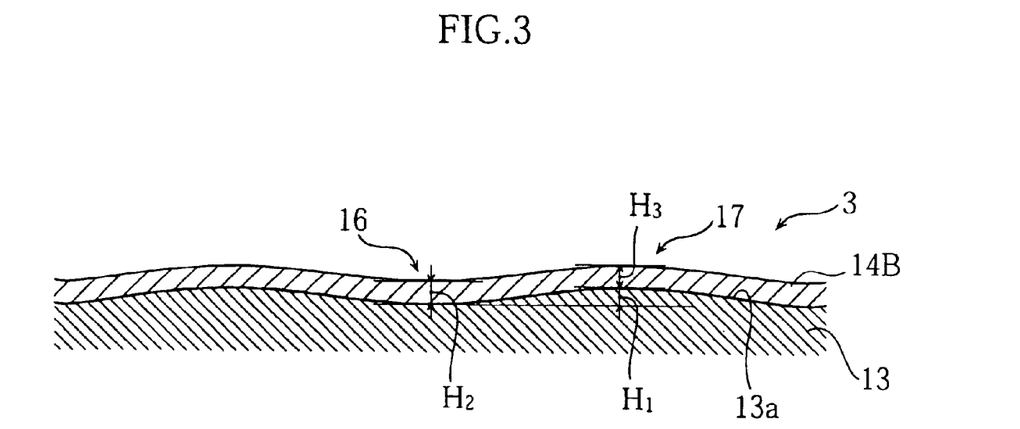
FIG. 3 is a partially enlarged sectional view showing a reflective electrode and an alignment film of the liquid crystal display device shown in FIG. 1.

The surface 13a of each reflective electrode 13 is gently undulated, as shown in the FIG. 3. The light rays coming to the surface 13a of the reflective electrodes 13 are suitably scattered. The height $H_1$ of the undulation on the surface 13a of the reflective electrode 13 is smaller than the thickness $H_2$ of the alignment film 14B at a concave portion 16 of the undulation.

Specifically, the height $H_1$ of the undulation on the surface 13a of each reflective electrode 13 is approximately 0.03–0.1 µm. The thickness $H_2$ of the alignment film 14B is approximately 0.04–0.15 µm, for example. A pitch between adjacent concave portions 16 of the undulation is approximately 10 µm.

The surface 13a of the respective reflective electrodes 13 undulates gently within the range of the thickness $H_2$ of the alignment film 14B. Thus, the surface of the alignment film 14 becomes more planar. Therefore, the liquid crystal molecules contained in the liquid crystal layer 3 made to have a generally equal pre-tilt angle in the respective display regions. As a result, it is possible to appropriately activate the reflective electrodes 13 and the transparent electrodes 11 separately in e.g. a passive matrix display mode to provide a desired contrast.

Further, since the surface 13a of the reflective electrodes 13 are gently undulated, the light rays reaching the surface 13a of the reflective electrodes 13 are suitably scattered. As a result, it is possible to prevent a mirror imaging phenomenon and a contrast deterioration.

With the structure mentioned above, the height $H_1$ of the undulation on the respective reflective electrodes 13 is approximately 0.03–0.1 µm, most preferably 0.03 µm. In the case where the liquid crystal layer 3 includes an STN liquid crystal which needs uniformizing the cell gap (the thickness of the liquid crystal layer 3), the height of the undulation should be preferably less than 0.05 µm, which is 1/100 of the cell gap. When the height $H_1$ of the undulation on the reflective electrodes 13 is set to be 0.03 µm, the undulation on the surface of the reflective electrodes 13 will not influence the uniformity of the cell gap. Therefore, the deterioration of display representation with the STN liquid crystal is prevented.

Referring to FIG. 3, the thickness $H_3$ of the alignment film 14B at a projecting portion 17 of the undulation on each reflective electrode 13 may be smaller than the height $H_1$ of the undulation on the reflective electrodes 13. Due to this, the surface of the alignment film 14B becomes more planar.

The surface 13a of each reflective electrode 13 may be unduated in the following manner. First, an aluminum or silver film is vapor-deposited on the surface 2a of the second substrate 2, and a resist layer (not shown) made of a photosensitive resin is formed thereon. Next, the resist layer is processed into a mask with patterned openings (not shown). Then, etching is performed through the mask to form edged projections. Finally, the mask is removed, and heating is performed to cause the aluminum or silver film to be undulated. In this case, the height $H_1$ of the undulation formed by etching and heating is smaller than the thickness $H_2$ of the alignment film 14B at a concave portion 16.

In the liquid crystal display device, when light reaches the polarizer plate 5, light components that vibrate only in a specific direction pass the polarizer plate 5 to be polarized, and travel through the retardation plate 6 and the first substrate 1.

After travelling through the first substrate 1, the light rays travel through the color filter layer 7, the transparent electrodes 11 and the alignment film 14A to enter the liquid crystal layer 3. The light rays entering portions of the liquid crystal layer where the liquid crystal molecules are untwisted by voltage impression do not change the vibrational direction, and impinge on the reflective electrodes 13 via the alignment film 14B. On the other hand, the light rays entering portions where a voltage is not impressed on the liquid crystal molecules change the vibrational direction before impinging on the reflective electrodes 13.

The light rays impinging on the reflective electrodes 13 are reflected on their surface 13a. The light rays reflected on the reflective electrodes 13 travel back through the same path to impinge on the polarizer plate 5. On the way back, the light rays travelling through portions of the liquid crystal layer where a voltage is impressed have not changed the vibrational direction. The light rays travelling through portions where a voltage is not impressed have changed the vibrational direction.

Among the light rays impinging on the polarizer plate 5, those that have not changed the vibrational direction in the liquid crystal layer 3 go through the polarizer plate 5, whereas those that have changed the vibrational direction do not go through the polarizer plate 5. Therefore, those pixels which have not undergone voltage application will be represented in black. Those pixels which have undergone voltage application will be represented in red, green, blue or any suitably mixed color of these three according to the light passage area and the amount of light.

Figure 4:
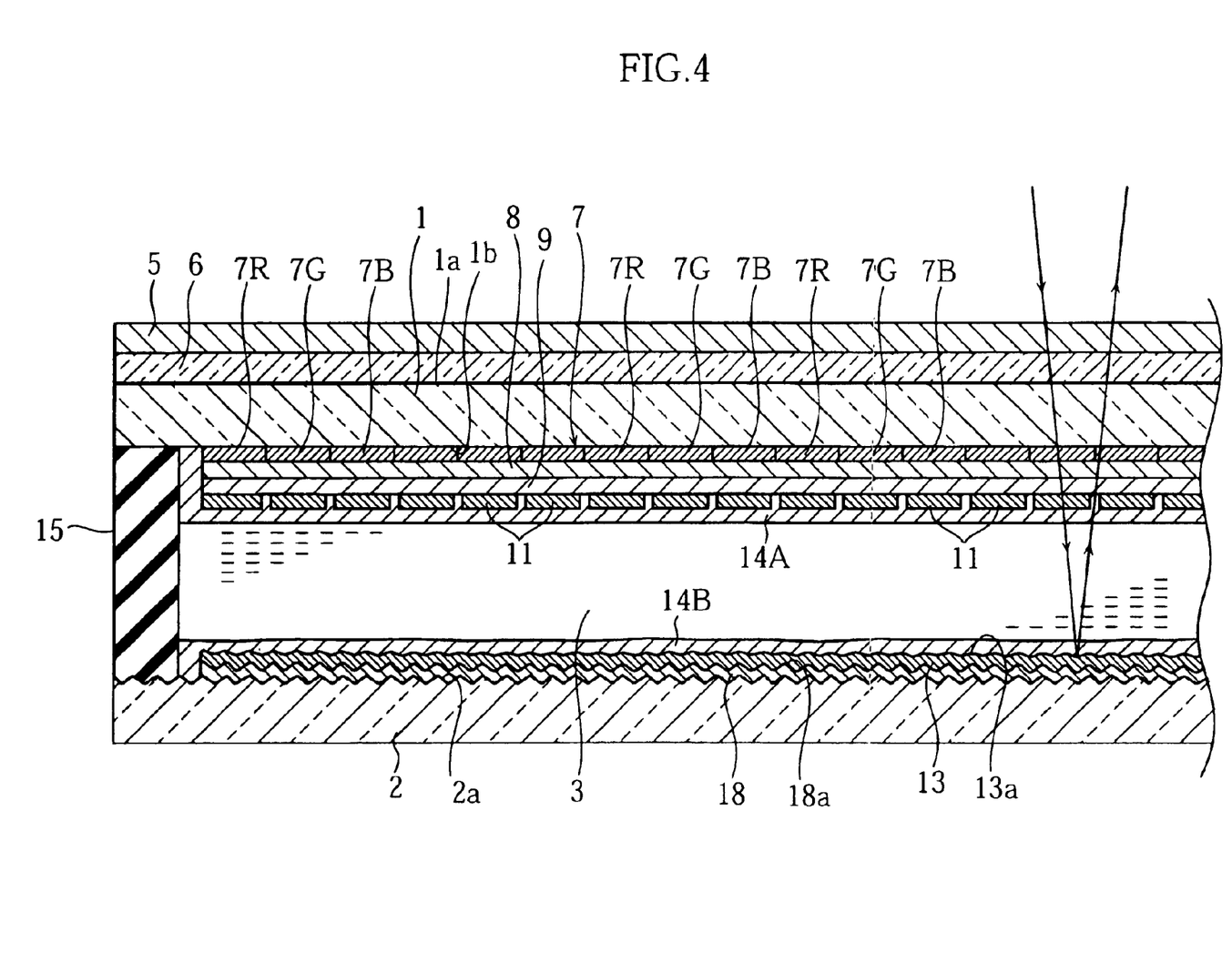
FIG. 4 is a sectional view showing a principal portion of a liquid crystal display device in accordance with a second embodiment of the present invention.

FIG. 4 is a sectional view showing a principal portion of a liquid crystal display device in accordance with a second embodiment of the present invention. Referring to this figure, a second substrate 2 includes a surface 2*a* provided with a smoothing layer 18. The smoothing layer 18 includes a surface 18*a* provided with reflective electrodes 13. Each of the reflective electrodes 13 includes a surface 13*a* provided with an alignment film 14B.

The smoothing layer 18 generally smoothes and flattens the undulation on the surface 13*a* of the reflective electrodes 13. The smoothing layer 18 is made of an acrylic resin, which also makes the overcoat layer 8, applied by the spin-coat method and then dried. The height $H_1$ of the undulation on the surface 13*a* of the reflective electrodes 13 is set to be smaller than the thickness $H_1$ of the alignment film 14B at a concave portion 16 of the undulation, as shown in the FIG. 5. Other features of the structure are similar to those of the first embodiment.

Figure 5:
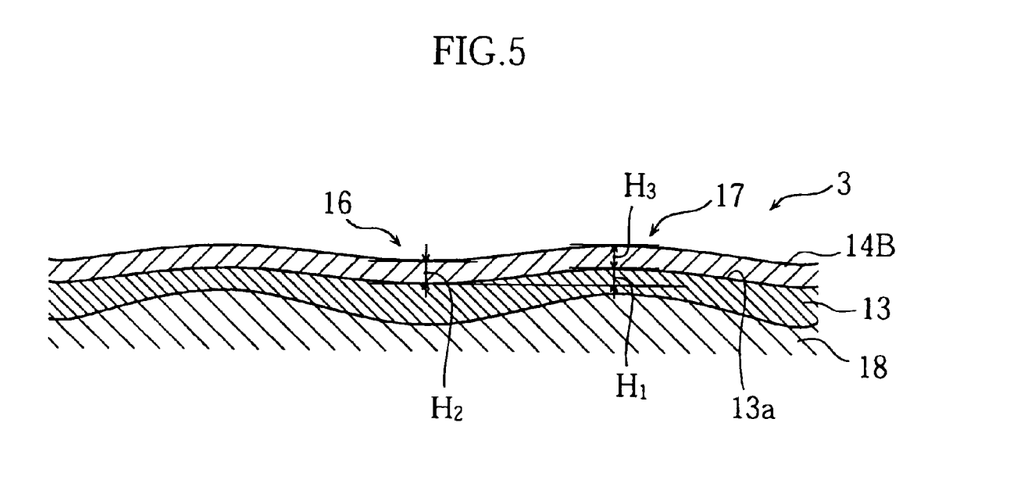
FIG. 5 is a partially enlarged sectional view showing a reflective electrode and an alignment film of the liquid crystal display device shown in FIG. 4.

When the smoothing layer 18 is disposed between the second substrate 2 and each reflective electrodes 13 as in this structure, the smoothing layer 18 smoothes the surface 13*a* of the reflective electrode 13. Consequently, it smoothes the surface of the alignment film 14B provided on the surface 13*a* of the reflective electrode 13. Therefore, the liquid crystal molecules are inclined at generally the same pre-tilt angle in the respective display regions, thereby providing similar advantages as in the above embodiment.

If the smoothing layer 18 is too thick, the threshold of drive voltage may change. Thus, the smoothing layer 18 may be preferably formed with a suitable thickness. An acrylic resin for forming the smoothing layer 18 may be applied by screen printing or any other method.

The smoothing layer 18 may contain $SiO_2$. This prevents separation of alkali from the second substrate 2 even in the case where the second substrate 2 is made of e.g. soda lime glass.

The smoothing layer 18 in this case may be made by mixing $SiO_2$ particles with an organic solvent, applying the $SiO_2$ containing organic solvent onto the surface 2*a* of the second substrate 2, and drying it.

The scope of the present invention is, of course, not limited to the above-described embodiments. For example, the structure of the reflective electrodes 13 and the alignment film 14B, which are employed in the liquid crystal display device capable of providing color representations in the above-described embodiments, may be adopted in a monochrome liquid crystal display device.

What is claimed is:

1. A liquid crystal display device comprising: a first and a second substrates disposed in parallel to each other; a liquid crystal layer disposed between the two substrates and filled with liquid crystal; and a reflective member having a reflective surface on which light rays coming from outside through the first substrate and the liquid crystal layer are reflected towards the first substrate;

wherein the reflective surface of the reflective member is undulated;

wherein the reflective surface of the reflective member is provided with an alignment film for twisting liquid crystal molecules contained in the liquid crystal layer; and wherein a height of a raised portion of the undulation on the reflective surface of the reflective member is smaller than, at least, a thickness of the alignment film at a concave portion of the undulated reflective surface, the reflective member having a nonconstant thickness and being greater in thickness at the concave portion of the undulated reflective surface than at the raised portion of the undulation.

2. The liquid crystal display device according to claim 1, wherein the height of the undulation on the reflective surface of the reflective member is in the range of 0.03–0.1 $\mu$m.

3. The liquid crystal display device according to claim 1, further comprising a smoothing layer for smoothing the undulated reflective surface of the reflective member between the second substrate and the reflective member.

4. The liquid crystal display device according to claim 3, wherein the second substrate is made of soda lime glass; the smoothing layer containing $SiO_2$.

5. A process for making a liquid crystal display device which comprises: a first and a second substrates disposed in parallel to each other; a liquid crystal layer disposed between the two substrates and filled with liquid crystal; and a reflective member having a reflective surface on which light rays coming from outside through the first substrate and the liquid crystal layer are reflected towards the first substrate; the process comprising the steps of:

forming a reflective member on a surface of the second substrate, the reflective member having an undulated reflective surface and having a nonconstant thickness; and forming an alignment film on the reflective surface of the reflective member;

wherein the step of forming the reflective member is performed in a manner such that a height of a raised portion of the undulation is smaller than at least the thickness of the alignment film at a concave portion of the undulation, the reflective member being greater in thickness at the concave portion of the undulation than at the raised portion of the undulation.

6. The process for making the liquid crystal display device according to claim 5, further comprising the step of forming a smoothing layer between the second substrate and the reflective member;

the step of forming the smoothing layer includes:

applying a bond material containing $SiO_2$ on a surface of the second substrate and fixing the contained $SiO_2$ to form the smoothing layer.

* * * * *